United States Patent
Tait et al.

(10) Patent No.: US 10,009,135 B2
(45) Date of Patent: Jun. 26, 2018

(54) SYSTEM AND METHOD FOR PHOTONIC PROCESSING

(71) Applicants: Alexander N. Tait, Princeton, NJ (US); Mitchell A. Nahmias, Princeton, NJ (US); Bhavin J. Shastri, Lawrenceville, NJ (US); Paul R. Prucnal, Princeton, NJ (US)

(72) Inventors: Alexander N. Tait, Princeton, NJ (US); Mitchell A. Nahmias, Princeton, NJ (US); Bhavin J. Shastri, Lawrenceville, NJ (US); Paul R. Prucnal, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 211 days.

(21) Appl. No.: 15/017,142

(22) Filed: Feb. 5, 2016

(65) Prior Publication Data
US 2017/0302396 A1    Oct. 19, 2017

Related U.S. Application Data

(60) Provisional application No. 62/112,730, filed on Feb. 6, 2015.

(51) Int. Cl.
*H04J 14/00* (2006.01)
*H04B 10/20* (2006.01)
(Continued)

(52) U.S. Cl.
CPC ........ *H04J 14/0204* (2013.01); *H04B 10/275* (2013.01); *H04B 10/80* (2013.01)

(58) Field of Classification Search
USPC ........................................ 398/59, 68
See application file for complete search history.

(56) References Cited

U.S. PATENT DOCUMENTS

| | | | | |
|---|---|---|---|---|
| 5,878,265 A | * | 3/1999 | Hartmann | G06F 15/17337 712/11 |
| 8,659,820 B1 | * | 2/2014 | Giallorenzi | H03H 17/0266 359/325 |

(Continued)

OTHER PUBLICATIONS

Sebastian Le Beux, "Optical Ring Network-on-Chip (ORNoC): Architecture and Design Methodology", Sep. 2, 2011, HAL archives, All Pages.*

(Continued)

*Primary Examiner* — David Payne
*Assistant Examiner* — Pranesh Barua
(74) *Attorney, Agent, or Firm* — Meagher Emanuel Laks Goldberg & Liao, LLP (57) ABSTRACT

According to some embodiments, a network architecture is disclosed. The network architecture includes a plurality of processing network nodes. The network architecture further includes at least one broadcasting medium to interconnect the plurality of processing network nodes where the broadcasting medium includes an integrated waveguide. The network architecture also includes a broadcast and weight protocol configured to perform wavelength division multiplexing such that multiple wavelengths coexist in the integrated waveguide available to all nodes of the plurality of processing network nodes.

20 Claims, 8 Drawing Sheets

(51) Int. Cl.
   *H04J 14/02* (2006.01)
   *H04B 10/275* (2013.01)
   *H04B 10/80* (2013.01)

(56) References Cited

U.S. PATENT DOCUMENTS

| | | | | |
|---|---|---|---|---|
| 9,608,839 | B2* | 3/2017 | Schulz | H04L 12/423 |
| 9,722,397 | B2* | 8/2017 | Takabayashi | H01S 5/142 |
| 2004/0136715 | A1* | 7/2004 | Kondo | G02B 6/43 |
| | | | | 398/82 |
| 2006/0268909 | A1* | 11/2006 | Langevin | H04L 49/15 |
| | | | | 370/405 |
| 2008/0166095 | A1* | 7/2008 | Popovic | G02B 6/107 |
| | | | | 385/126 |
| 2010/0278532 | A1* | 11/2010 | Scandurra | H04B 10/803 |
| | | | | 398/45 |
| 2010/0284649 | A1* | 11/2010 | Ishii | G02F 1/0147 |
| | | | | 385/31 |
| 2010/0287326 | A1* | 11/2010 | Chou | G06F 13/4022 |
| | | | | 710/316 |
| 2011/0142391 | A1* | 6/2011 | Asghari | G02F 1/2257 |
| | | | | 385/2 |
| 2012/0148244 | A1* | 6/2012 | Park | G02B 6/12007 |
| | | | | 398/58 |
| 2012/0201171 | A1* | 8/2012 | Ramanujam | G06F 15/7825 |
| | | | | 370/258 |
| 2013/0016970 | A1* | 1/2013 | Koka | G02B 6/4246 |
| | | | | 398/49 |
| 2014/0016931 | A1* | 1/2014 | Meade | H04Q 11/0005 |
| | | | | 398/48 |
| 2015/0117261 | A1* | 4/2015 | Kumar | G06F 17/5068 |
| | | | | 370/255 |
| 2015/0139646 | A1* | 5/2015 | Thonnart | G02B 6/43 |
| | | | | 398/58 |
| 2015/0163570 | A1* | 6/2015 | Zid | H04Q 11/0005 |
| | | | | 398/45 |
| 2015/0381301 | A1* | 12/2015 | Jeong | G02B 6/29397 |
| | | | | 398/79 |

OTHER PUBLICATIONS

Tait, et al. "Broadcast and Weight: An Integrated Network for Scalable Photonic Spike Processing" Journal of Lightwave Technology, vol. 32, No. 21, (Nov. 1, 2014).
Yang, et al. "On-Chip CMOS-Compatible Optical Signal Processor" Optics Express, vol. 20, No. 12, (Jun. 4, 2012).
Tait, et al. "Broadcast-and-weight Interconnects for Integrated Distributed Processing Systems", Proceedings of the IEEE, (2014).
Nahmias, et al. "An Integrated Analog O/E/O Link for Multi-Channel Laser Neurons", Applied Physics Letters, vol. 108, (2016).
Tait, et al. "Continuous Calibration of Microring Weights for Analog Optical Networks", IEEE Photonics Technology Letters, vol. 28, No. 8, (Apr. 15, 2016).
Chang, et al. "Photonic Microwave Finite Impulse Response Filter Using a Spectrally Sliced Supercontinuum Source", Applied Optics, vol. 51, No. 19, (Jul. 1, 2012).
Le Beux, et al. "Optical Ring Network-on-Chip (ORNoC): Architecture and Design Methodology", EDAA, (2011).
Pickett, et al. "A Scalable Neuristor Built with Mott Memristors" Nature Materials, vol. 12 (Feb. 2013).
Nahmias, et al. "A Leaky Integrate-and-Fire Laser Neuron for Ultrafast Cognitive Computing", IEEE Journal of Selected Topics in Quantum Electronics, vol. 19, No. 5, (2013).
Tait, et al. "Experimental Demonstration of WDM Weighted Addition for Principal Component Analysis", Journal of the Optics Society of America, vol. 30, No. 11, (Nov. 2013).
Shastri, et al. "Photonic Spike Processing: Ultrafast Laser Neurons and an Integrated Photonic Network", IEEE Photonics Society News, vol. 28, No. 3, (Jun. 2014).

* cited by examiner

SYSTEM AND METHOD FOR PHOTONIC PROCESSING

CROSS-REFERENCE TO RELATED APPLICATIONS

This application claims priority to provisional application 62/112,730, filed on Feb. 6, 2015, which is herein incorporated by reference.

FIELD OF THE INVENTION

Embodiments of the present invention relate generally to network architectures, and more particularly, to network architectures configured for a broadcast and weight protocol.

BACKGROUND OF THE INVENTION

Application demands are now outpacing Moore's law. Data acquisition, execution, and control requirements are reaching nanosecond time scales in the fields of communications, aerospace, and finance. For example, hypersonic aerial vehicles require sophisticated control algorithms that operate with high precision on smaller time scales. The implementation of sub-microsecond high frequency trading algorithms and large-scale Monte Carlo simulations require highly specialized hardware to match performance objectives in algorithmic finance. Other application areas include live packet inspection, routing, server control optimization, and image processing. All of these systems rely on low-latency solutions to computational problems that contain numerous variables. Currently, these problems are addressed by high performance electronic digital signal processing (DSP) hardware and field programmable gate arrays (FPGAs). However, state-of-the-art processors are reaching fundamental barriers in their interconnectivity, power efficiency, and speed.

Integrated photonic platforms represent an alternative to microelectronic approaches. The communication potentials of optical interconnects (bandwidth, energy use, electrical isolation) are expected to alleviate many of the communication bottlenecks in conventional computers that have contributed to the end of Moore's law in power consumption. Techniques in silicon photonic integrated circuit (PIC) fabrication are driven by a tremendous demand for optical interconnects within conventional digital computing systems. The first platforms for systems integration of active photonics are becoming a commercial reality and promise to bring economies of integrated circuit manufacturing to optical systems.

Optical devices and interconnects have received attention in the past, particularly in regards to neural networking. However, attempts to realize holographic or matrix-vector multiplication systems have encountered practical barriers, particularly because they cannot be integrated, let alone with effective nonlinear processing units. Using a device set designed for digital communication (waveguides, filters, detectors, etc.), PICs have been realized for analog signal processing. The potential of modern PIC platforms to enable large-scale all-optical systems for unconventional and/or analog computing has not yet been investigated.

There has been an emergence of a new class of optical devices that exploit a dynamical isomorphism between semiconductor photocarriers and neuron biophysics, a behavior called spiking. The difference in physical timescales between bio-chemical and electro-optic phenomena allows these "photonic neurons" to exhibit neuron-like behavior on picosecond (instead of millisecond) timescales. This allows them to receive and generate ultrafast signals, i.e. signals with frequency components greater than 1 GHz. Non-spiking neuron behaviors and models, including continuous analog approximations (e.g. Hopfield neurons) and binary, digital approximations (e.g. perceptrons), may also be represented as functions realizable by other electro-optic devices, which are also potentially ultrafast. Despite the variety of possible implementations, "photonic neurons" share a common need for a networking architecture with which many photonic neurons may be interconnected before they may be applied to solve real problems in computing.

As such, a network of ultrafast reconfigurable processors may open computational domains that demand unprecedented temporal precision, power efficiency, and functional complexity, potentially including applications in wideband radio frequency (RF) processing, adaptive control of multi-antenna systems, high-performance scientific computing, real-time control of fast mechanical systems (e.g. hypersonic aircraft), low-latency analysis of financial market data, and high-efficiency simulations aiding in computational neuroscience. Although the ultrafast dynamics of spiking and integrated photonic neurons show potential in this respect, most analyses of them has so far been limited to one or two devices with minimal regard for a compatible network architecture.

Thus, there is a need for a photonic networking architecture configured to address these and other shortcomings of the current systems.

SUMMARY OF THE INVENTION

According to some embodiments, a network architecture is disclosed. The network architecture includes a plurality of processing network nodes. The network architecture further includes at least one broadcasting medium to interconnect the plurality of processing network nodes where the broadcasting medium includes an integrated waveguide. The network architecture also includes a broadcast and weight protocol configured to perform wavelength division multiplexing such that multiple wavelengths coexist in the integrated waveguide available to all nodes of the plurality of processing network nodes.

According to some embodiments, a method for implementing a network architecture is disclosed. The method includes the steps of interconnecting a plurality of processing network nodes through at least one broadcasting medium, the broadcasting medium comprising an integrated waveguide; and configuring a broadcast and weight protocol to perform wavelength division multiplexing such that multiple wavelengths coexist in the integrated waveguide available to all nodes of the plurality of processing network nodes.

According to some embodiments, a non-transitory computer-readable medium having stored thereon a computer program for execution by a processor configured to perform a method for implementing a network architecture is disclosed. The method includes interconnecting a plurality of processing network nodes through at least one broadcasting medium, the broadcasting medium comprising an integrated waveguide; and configuring a broadcast and weight protocol to perform wavelength division multiplexing such that multiple wavelengths coexist in the integrated waveguide available to all nodes of the plurality of processing network nodes.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Disclosed herein is a novel technology platform that applies optimization algorithms several orders of magnitude faster than conventional systems. This platform, which leverages recent advances in silicon photonics, exploits the unique properties of light to address two fundamental limitations in high speed electronics: dense low-latency interconnects between processors and heat dissipation. The impact of this technology may be far reaching, as high-dimensional problems demand fast solutions in areas such as financial markets, data triggering and acquisition, network anomaly detection, server scheduling, and real-time radio frequency processing (e.g. on-the-fly wireless communications amongst first responders or soldiers).

The platform disclosed is an on-chip networking architecture, referred to as "broadcast and weight", which could support massively parallel interconnection between distributed photonic processing elements. The architecture has similarities with optical networking techniques that channelize usable bandwidth using wavelength division multiplexing (WDM). However, the disclosed protocol flattens the traditional layered hierarchy of optical networks, accomplishing physical, logical, and processing tasks in a compact computational primitive, henceforth referred to as a "processing network node". Although the disclosed processing circuits and functions are unconventional, the required device set is compatible with mainstream PIC platforms in silicon or III-V materials generally, which make heavy use of WDM techniques, thereby making it practical and cost-effective to construct.

The networking architecture disclosed herein generally includes three aspects: a protocol, a plurality of nodes that abides by that protocol, and a network medium that supports multiple connections between the plurality of nodes. The protocol is a WDM broadcast protocol where many signals may coexist in a single waveguide and all participant units have access to all the signals. Each node may be a processing-network node (PNN), which is a primitive unit that performs the physical and logical functions required for broadcast and weight networking and neuromorphic processing, respectively. The network medium includes a broadcast loop (BL), which defines the medium in which the broadcast network exists and physically links a plurality of PNNs to one another. While exemplary embodiments will be discussed in the context of a neural network, one skilled in the art will understand alternative embodiments of the disclosed invention may be used in other network architectures, including but not limited to perceptron networks, Hopfield neural networks, spiking neural networks, and field-programmable gate arrays. In perceptron networks, the output of each node is described by a nonlinear function of a weighted sum of inputs. In linear Hopfield neural networks, the output of each node is described by a nonlinear function of a linear system (i.e. filter) applied to a weighted sum of inputs. In spiking neural networks, the output of each node is described by a nonlinear dynamical process on a weighted sum of inputs. In field-programmable gate arrays, the output is a digital function of inputs.

The configuration of the network architecture is determined by its weight matrix, where an element $w_{ij}$ signifies the strength of the connection from node i to node j. A single transmission device cannot alter the polarity of signals represented as optical power, so effective neural weighting requires two optical filters per channel dropping power into a balanced push-pull photodetector in order to implement both positive and negative weights. A processor can exhibit a large variety of behavior through reconfiguration of the weight matrix.

In the case of spiking networks as a nonlimiting example, communication signals are pulses: binary in amplitude and asynchronous in time. For interconnecting signals with spikes represented as physical pulses (as opposed to digital packets as in address event representation (AER)), temporal multiplexing and switch- or packet-based routing techniques are not viable strategies because spike timing is an informatic dimension unavailable for multiplexing. Another non-limiting example is analog networks, where communication signals are continuous in time and amplitude. The content of analog signals is easily corrupted by discrete switching events, making temporal multiplexing and switch- or packet-based routing techniques practically nonviable. In contrast, the disclosed network architecture can support a large number of parallel, asynchronous, and reconfigurable connections between distributed groups of photonic processing primitives compatible with the approach of spikes represented physically as optical pulses.

WDM channelization of the spectrum is a method to efficiently use the full capacity of a waveguide, which can have useable transmission windows up to, and potentially exceeding, 80 nm wide (i.e. 10 THz bandwidth). In optical communication networks, a WDM protocol called "broadcast and select" may create many potential connections between nodes. The active connection is selected by tuning a filter at a receiver to drop the desired wavelength, rather than altering an intervening medium. In contrast, the broadcast and weight protocol disclosed herein for a processing network or other network architectures differs by allowing multiple inputs to be dropped simultaneously and with intermediate strengths between 0% and 100%. Broadcast and weight protocol defines the input of a node as a waveguide containing WDM signals and creates a new signal that is a process of the inputs signals. The protocol defines the node's output as a waveguide containing nominally the same signals, except replacing its designated wavelength channel with the new signal. The process by which a new signal is derived from several input signals may be digital in nature, as in a logic gate. As an example, careful configuration of a bank of add-drop rings for a two-port input system together with a simple nonlinear thresholding function right before (or during the application of) the E/O transducer would allow one to emulate several major logic gates (i.e. AND, OR, and NOT). A reconfigurable network of processing-networking nodes performing such a process would resemble a field-programmable gate array (FPGA).

Figure 1:
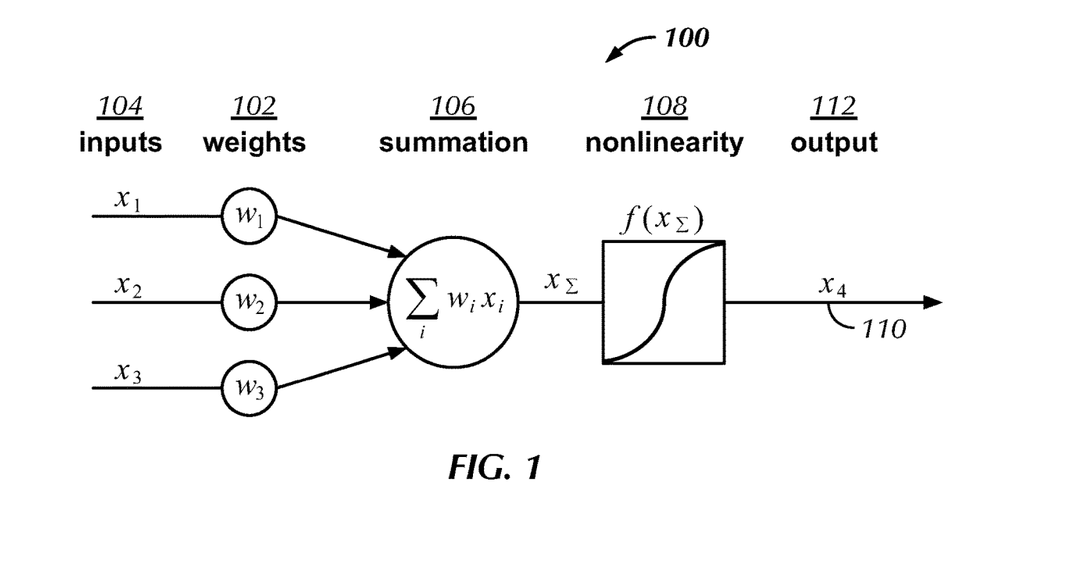
FIG. 1 is a diagram of a processing network node utilizing broadcast and weight according to an embodiment of the present invention.

Broadcast and weight includes a plurality of nodes sharing a common medium, where the output of every node is assigned a unique transmission wavelength and made available to every other node. FIG. 1 illustrates a processing network node 100 utilizing broadcast and weight according to an embodiment of the present invention. The node 100 has configurable weight banks 102 at its inputs 104. By tuning continuously between 0%-100% drop states, the weight banks 102 drops a portion of its corresponding wavelength channel, thereby applying a coefficient of transmission. Each weight bank 102 of a given input 104 operates in parallel, allowing each node to receive multiple inputs simultaneously. An interconnectivity pattern is determined by local states of weight banks 102 and not a state of the transmission medium between nodes. Routing in this network is transparent, parallel, and switchless, thereby being ideal to support asynchronous signals in a neural network.

The system 100 further includes a summation module 106 for each node. The total optical power of each spectrally weighted signal is detected, which yields the sum of the input channels 104. The electronic signal then directly drives a nonlinear processor 108 (e.g. modulators or laser processing devices). The processor 108 transmits a distinct wavelength 110 through an output 112. These distinct wavelength channels from each node are then multiplexed into a single waveguide through a wavelength multiplexer.

The ability to control each connection and weight independently is critical for creating differentiation amongst processing elements. A great variety of possible weight profiles allows a group of functionally similar units to compute a tremendous variety of functions despite sharing a common set of available input signals. Reconfiguration of the drop states of the weight banks, corresponding to weight adaptation or learning, intentionally occurs on timescales much slower than spike signaling (ns, µs, or ms compared to ps). In a plurality of N nodes with N wavelengths, each node needs a dedicated weighted bank for all (N−1) possible inputs plus one weight bank at its own wavelength to add its output to the broadcast medium. The total number of weights in the system would thus scale quadratically with $N^2$.

In a biological neural network, the complicated structure of axons connecting neurons largely determines network interconnectivity patterns, so the role of neurons is predominantly computational (i.e. weighted addition, integration, thresholding). In contrast, the all-to-all nature of optical broadcast saddles photonic neuron primitive units with additional responsibilities of network control (i.e. routing, wavelength conversion, WDM signal generation, etc.).

An embodiment of the disclosed invention thereby includes a processing network node (PNN) which may perform both the computational and networking aspects required in a complete modular analog photonic processing system, achieving compactness by flattening the dual roles of processing and networking into a single set of devices. It may attain rich computational capabilities by leveraging analog physics offered by optoelectronics. Overall, the PNN is an unconventional repurposing of optoelectronic devices.

Figure 2:
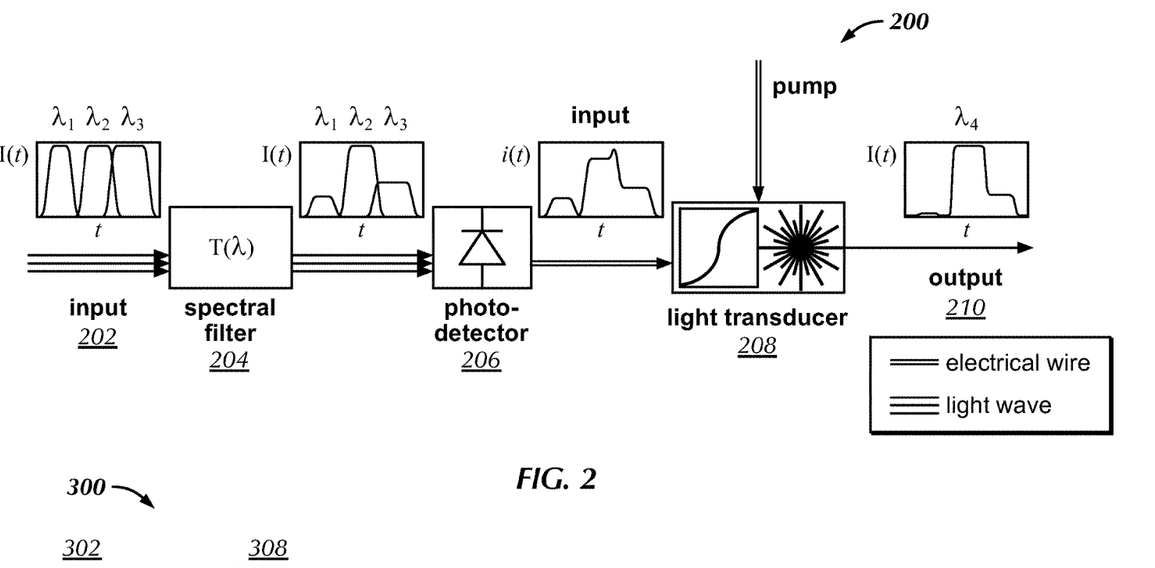
FIG. 2 is a diagram of a processing network node according to an embodiment of the present invention.

FIG. 2 illustrates a PNN 200 according to an embodiment of the present invention. The PNN 200 interacts with a WDM waveguide at an input 202 through tunable spectral filters banks 204. The filter banks 204 may represent the weights of excitatory (positive) input connections and/or inhibitory (negative) inputs. These weight profiles may be stored in local co-integrated or off-chip CMOS memory (not shown).

Figure 3:
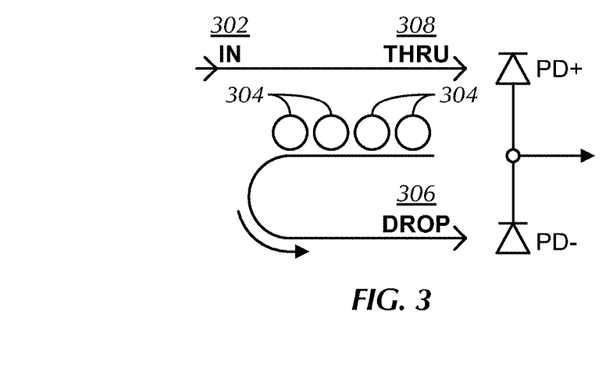
FIG. 3 is a diagram of a microring resonator weight bank according to an embodiment of the present invention.

Exemplary embodiments of the present invention implement microring resonator (MRR) weight banks, which have the advantages of compactness, WDM capability, and ease of tuning. FIG. 3 illustrates a MRR weight bank 300. In this nonlimiting example, it is assumed that the signals have already been dropeed from the bus waveguide (i.e. broadcast loop). The MRR weight bank 300 includes a WDM input 302 for receiving the waveguide. The MRR weight bank 300 further includes a plurality of resonators or filters 304 for tuning between on- and off-resonance, which switches a continuous amount of optical power between a drop (inhibitory) port 306 and a through (excitatory) port 308. While four resonators 304 are shown in FIG. 3, any number of resonators may be utilized. The inhibitory and/or excitatory output may be tuned over the full range of weights. In order to achieve a weight of 0, the resonators must be tuned to couple half of light from the through to drop port, so that the excitatory and inhibitory signals cancel each other out.

As a nonlimiting example, MRR weight bank samples were fabricated on silicon-on-insulator wafers through UBC SiEPIC, where silicon thickness is 220 nm with fully etched 500 nm wide waveguides. Ti/Pt/Au heating contacts were then deposited on top of a 3 µm oxide passivation layer to provide MRR resonance tuning via thermos-optic effect. The weight bank device in this nonlimiting example includes two bus waveguides and four MRRs in a parallel add/drop configuration, each of which controls a single wavelength channel by tuning on or off resonance. MRR radii may vary from 6 µm to 8 µm and Q-factors are approximately 10,000. The sample was mounted on a temperature-controlled alignment stage and coupled to fiber with focusing subwavelength grating couplers.

Referring back to FIG. 2, the weighted (i.e. spectrally filtered) subsets of broadcast channels are output (without demultiplexing) to a photodetector 206, which may be a balanced photodiode pair. Photodetector 206 then outputs a current that represents total optical power, thus computing the weighted sum and/or difference of WDM inputs in the process of transducing them to an electronic signal, which is capable of modulating a transducer 208 (e.g. modulator or laser device). The balanced photodiode configuration enables inhibitory weighting, an essential capability of many network architectures.

Total optical power detection of a still multiplexed signal is uncommon because it irreversibly strips WDM signals of any trace of their identifying wavelength, which is counterproductive in the majority of situations. Information about a signal's origin is desirable in multiwavelength communication systems and is maintained by demultiplexing prior to photodetection. However, in neurocomputing context, the destruction of channel information corresponds with the summation function. The photodetector 206 can therefore be viewed as an additive computational element capable of many-to-one wavelength fan-in.

In an embodiment of the present invention, the front-end of the PNN 200 is not subject to optical-electronic-optical (O/E/O) conversion overhead. The cost, energy, and complexity typically involved in O/E/O are due to electronic receiver stages (i.e. amplification, sampling, and quantization) that normally follow photodetection in optical communication links. However, a pathway connecting the photodetector 206 to the transducer 208 is not significantly affected by dispersion or electromagnetic interference (EMI) in the present invention because the pathway can be made very short (less than 50 µm) regardless of fan-in degree. Other electronic components may be included in the pathway, such as but not limited to amplifiers or quantizers.

The electronic signal from the balanced photodetector 206 modulates a transducer 208, which may perform a dynamical and/or nonlinear process. As a nonlinear example where the transducer 208 is a laser device, the modulated laser gain medium may be an active optical semiconductor, which acts as a subthreshold temporal integrator with time-constant equal to carrier recombination lifetime. The laser device itself acts as a threshold detector, rapidly dumping energy stored in the gain medium into the optical mode when the net gain of the cavity crosses unity (similar to a passively Q-switched laser biased below threshold). In this way, the laser device emulates excitability on picosecond timescales. The lasing wavelengths of an array of excitable distributed feedback lasers could be tailored by altering the pitch of their gratings. By generating clean, stereotyped pulses at a single wavelength, the transducer 208 provides an optical signal necessary for broadcast and weight networking. All light may be generated and detected on-chip. Furthermore, excitable lasers effectively provide gain, since large pulse responses may be triggered by weak input pulses. If excitable gain is sufficient to counteract insertion and fan-out losses, active optoelectronics may not be necessary outside of the PNN 200.

While discussed with reference to a laser device, any electro-optic transducer 208 may apply numerous nonlinear operations without limiting the scope of the invention. The electrical signal may be turned into an optical signal either by directly driving a laser or by use of a modulator (which has a constant optical input provided by another laser). The output optical signal may be proportional to the input electrical signal (linear modulation), a continuous nonlinear function of the input, a dynamical nonlinear process of the input, or a discrete-valued digital representation of the input. The transducer 208 may also be preceded by purely electronic devices for amplification, filtering, or other nonlinear processing.

The PNN 200 finally includes an output 210, which adds the generated signal to the broadcast waveguide. Other wavelengths are nominally unaffected by this coupler, but any incoming signals at the assigned wavelength of the PNN 200 will be completely dropped and terminated, avoiding collision with a newly generated output.

Figure 4:
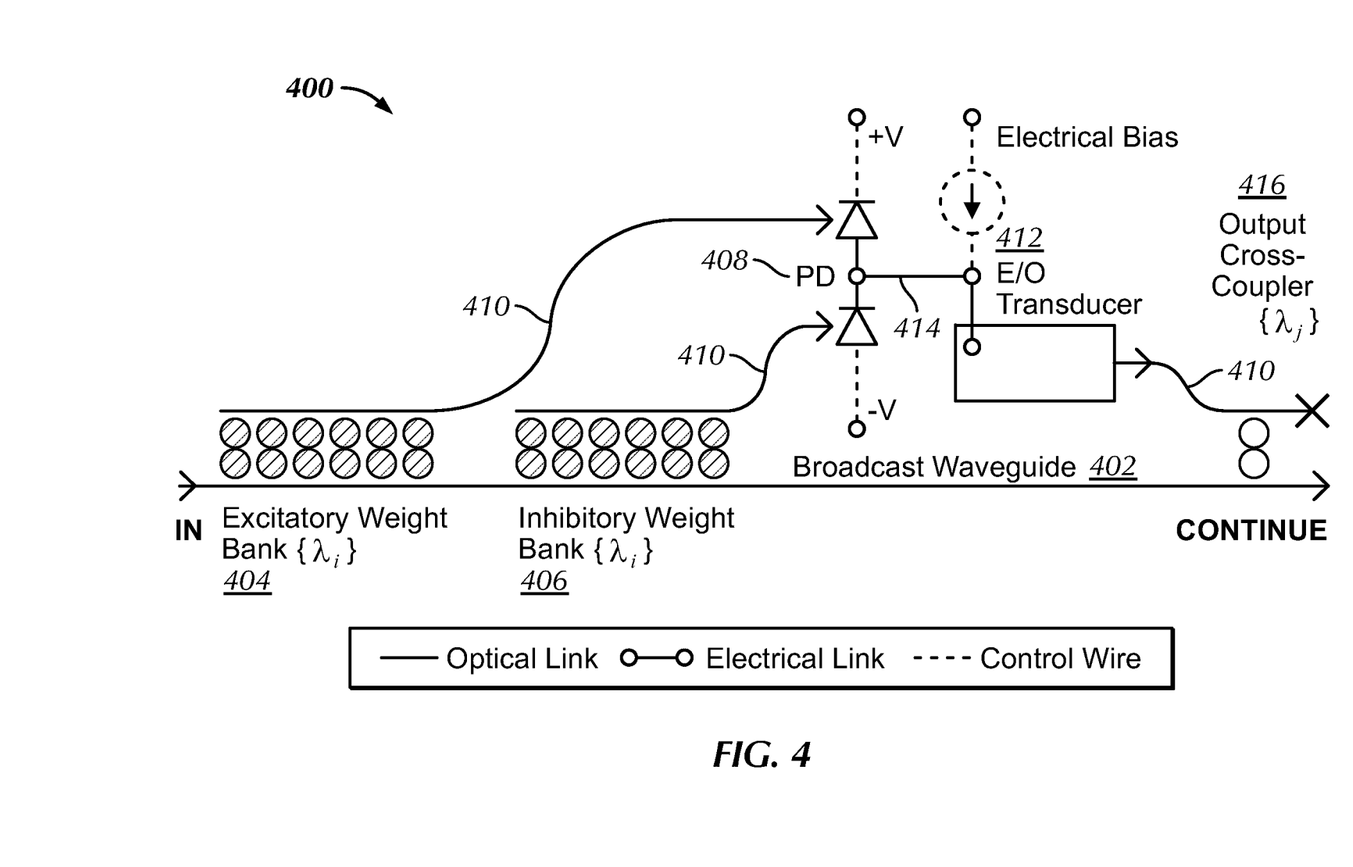
FIG. 4 is a diagram of a processing network node circuit according to an embodiment of the present invention.

FIG. 4 illustrates a PNN circuit 400 coupled to a broadcast waveguide 402 according to an embodiment of the present invention. The circuit 400 shows an excitatory weight bank 404 and inhibitory weight bank 406 connected to a photodetector 408 through optical links 410. The two banks 404 and 406 are continuously tunable microring drop filters that partially drop WDM channels that are present. The excitatory and inhibitory weight banks 404 and 406 drop directly from the bus waveguide. The weight banks 404 and 406 include a cascaded series of microrings. Single and multiple microrings in series may be interchanged with one another, though multiple microring structure leads to a sharper, higher-order filtering function. In this nonlimiting example, a weight of 0 corresponds to both inhibitory and excitatory weight banks 404 and 406 being tuned off resonance.

The photodetector 408 is then connected to a transducer 412 through an electrical link 414. The waveguide integrated photodetector 408 converts the optical signal to an electronic current and performs summation operations on the weighted banks 404 and 406. The transducer 412 converts the electrical signal back to an optical signal, and is further connected to an output coupler 416 through the optical link 410, which is coupled back into the broadcast waveguide 402 and sent to other PNN circuits.

Figure 5:
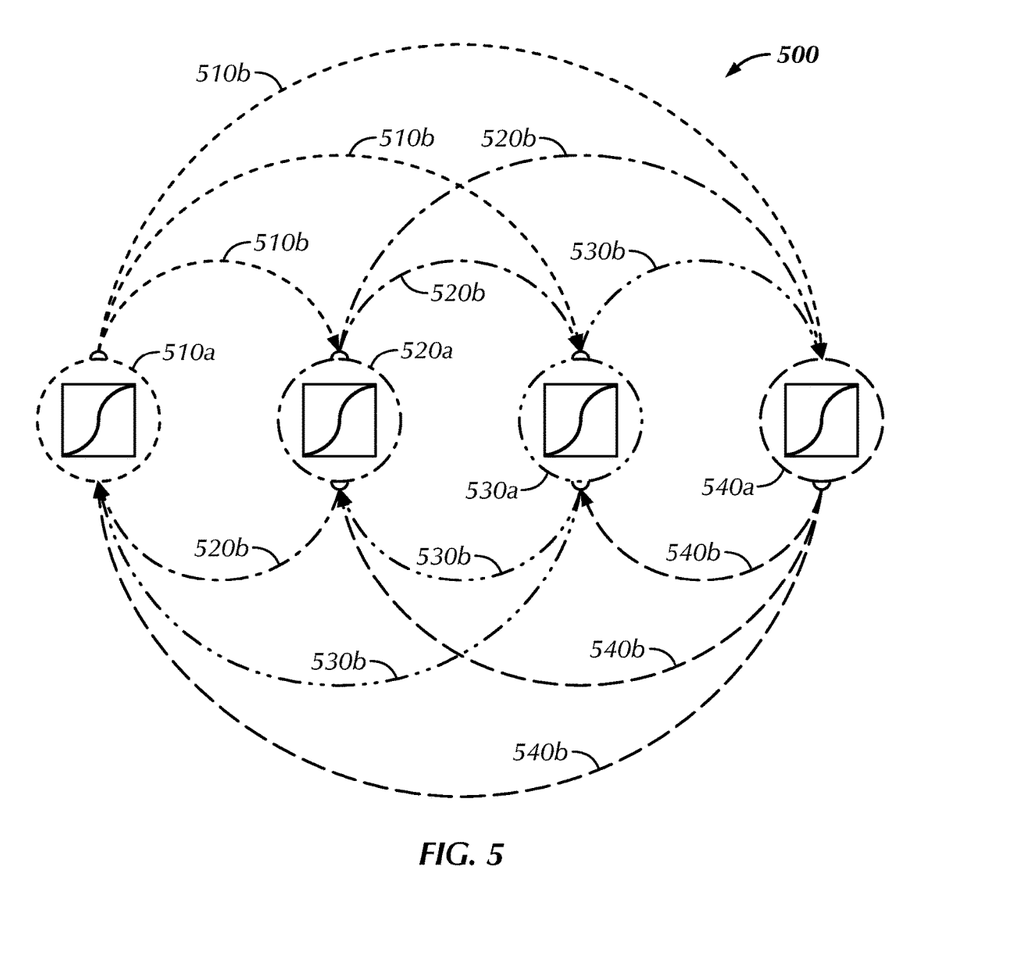
FIG. 5 is a diagram of a fully interconnected network according to an embodiment of the present invention.

A problem in neural networking and large parallel processing systems (e.g. GPUs or FGPAs) is the systems contain prominent one-to-many (multi-cast) and many-to-one (fan-in) components. FIG. 5 illustrates a diagram of a fully interconnected network 500 according to an embodiment of the present invention. While the network 500 includes four nodes 510a, 520a, 530a, and 540a, one skilled in the art will understand the network may include any number of nodes. Each node fans out to some or all other nodes. Therefore in this nonlimiting example, node 510a fans out to nodes 520a, 530a, and 540a through connections 510b, node 520a fans out to nodes 510a, 530a, and 540a through connections 520b, node 530a fans out to nodes 510a, 520a, and 540a through connections 530b, and node 540a fans out to nodes 510a, 520a, and 530a through connections 540b. Self-referent connections are possible, though not shown in the figure to avoid confusion. The increasingly high number of connections due to multi-cast and fan-in leads to large overhead in network architectures. In contrast, broadcast and weight only requires one optical waveguide. A single waveguide may support several hundred nodes simultaneously, corresponding to tens of thousands of simultaneous interconnects.

As such, the final aspect of an embodiment of the disclosed networking architecture is a physical medium that transports WDM optical signals between output couplers 210 and spectral filter banks 204 of a plurality of PNNs 200. Since routing is already performed by the PNN filters 204, the broadcast medium must simply implement an all-to-all interconnection, supporting all $N^2$ potential (not necessarily actual) connections between participating PNNs 200. This role may be performed by a single integrated waveguide, referred herein as a broadcast loop (BL). The BL may have a ring topology, though other topologies may also be utilized.

Figure 6:
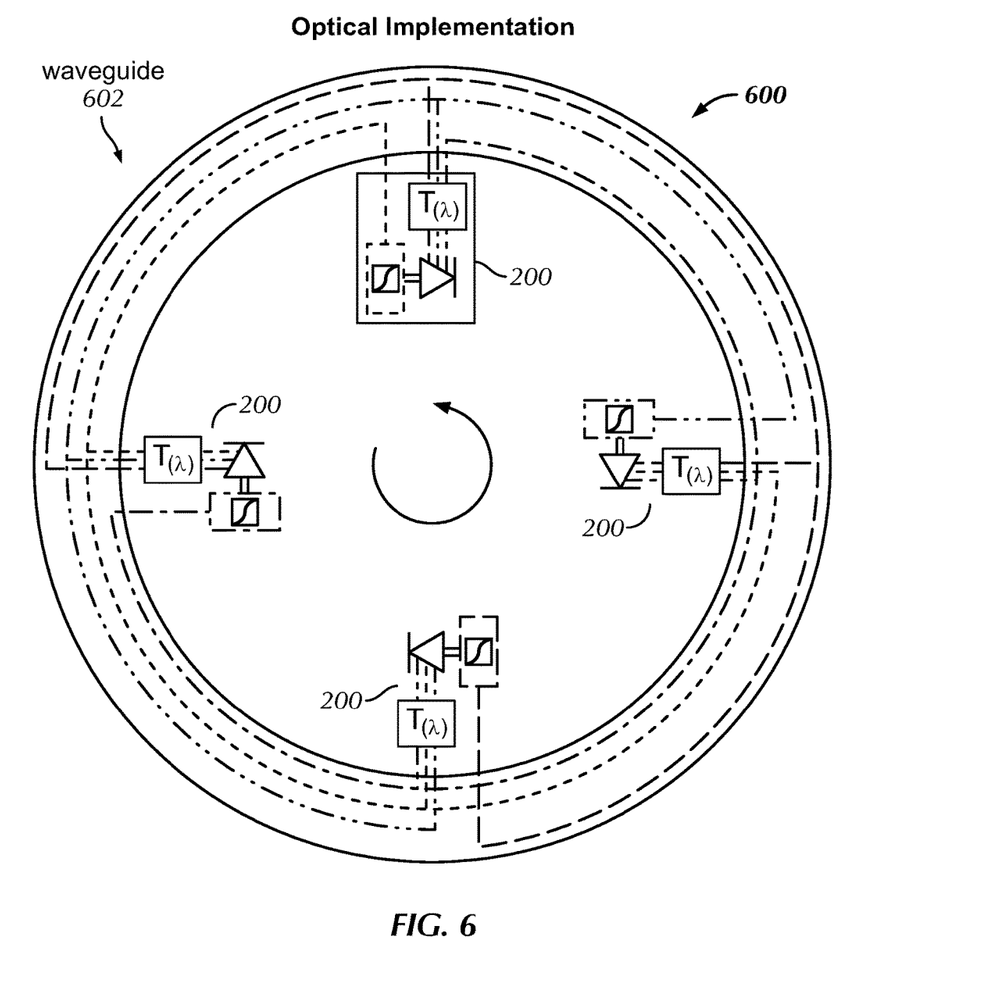
FIG. 6 is a diagram of a broadcast and weight cell including several node primitives coupled to a broadcast loop medium according to an embodiment of the present invention.

FIG. 6 illustrates a broadcast and weight cell 600 including several PNN primitives coupled to a BL medium. The BL waveguide 602 is fully multiplexed at all points along its length. Most signal power is allowed to continue through a PNN 200, even if a portion of it is dropped. This technique, referred herein as drop-and-continue, is an instance of lightpath splitting, where the information carried by an optical channel can be copied passively and instantaneously, albeit with a reduction in power. The weight-dependent signal power distribution of drop-and-continue creates an undesirable interdependency between filter weights at different nodes, which may present a control problem in adaptive systems. Drop-and-continue is a physical solution to optical multicasting that radically reduces network traffic for a given virtual interconnect density. The BL disclosed herein may reach its maximum potential, supporting up to $N^2$ independent interconnections in a waveguide with only N channels. Self-referent connections are possible, though not shown in the figure to avoid confusion.

Instead of outputting back into the same BL from which they receive their inputs, PNNs may also output into other BLs, connecting them. This leads to connections between topologically neighboring clusters and hierarchical networking, allowing for rapid transactions between topologically distant clusters.

Figure 7:
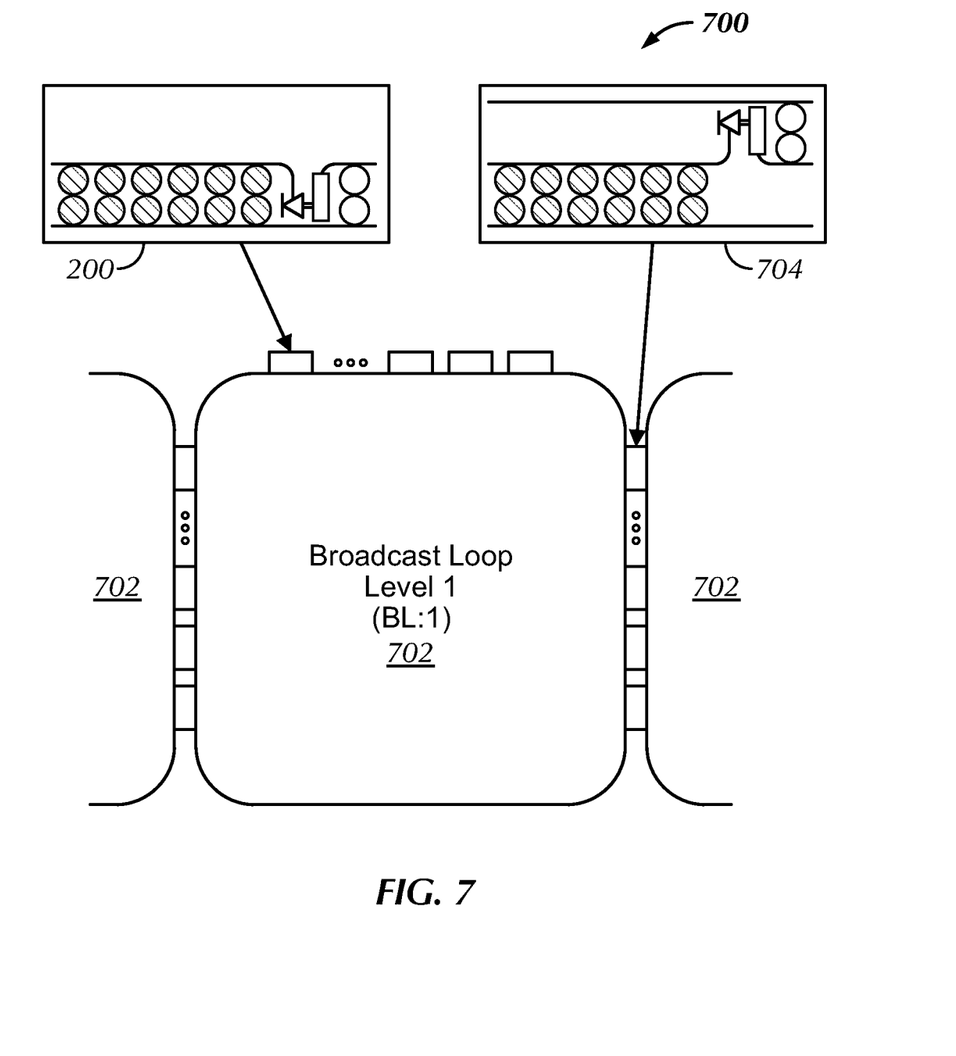
FIG. 7 is a diagram of a network architecture with multiple broadcast loops according to an embodiment of the present invention.

FIG. 7 illustrates an example of a network architecture 700 with multiple BLs 702 according to an embodiment of the present invention. The multiple BLs 702 integrated on the same chip could interact by designating interfacial PNNs 704: nodes that receive inputs from one BL and transmit into another. Thus, a unified processing system including multiple BLs 702 may be created without any additional arbitration, routing, or device technology. BLs 702 interacting through interfacial PNNs 704 constitute distinct broadcast media and may thus reuse the same optical spectrum. The operation of these broadcast media is dissociated from their exact geometry, as long as the loop topology is present. The associated spatial freedoms yield a promising variety of multi-BL architectures.

When determining structural constraints in distributed processing networks, communication and computation become fundamentally intertwined, so rules for organizing multi-BL architectures must shift to invoke concepts outside of the field of communication networks. The ability to incorporate these concepts in an optical system is made possible through a special topological property of broadcast and weight, referred to herein as spatial layout freedom.

Figure 8:
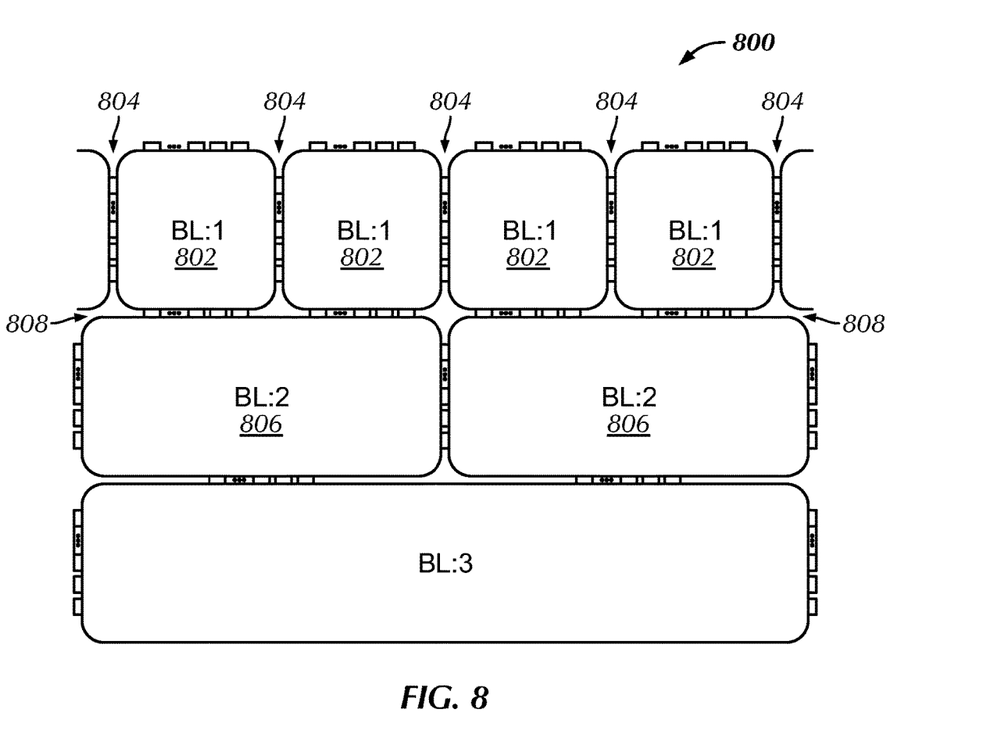
FIG. 8 is a diagram of a multi-BL structure according to an embodiment of the present invention.

A BL waveguide may manifest any shape in order to accommodate any layout of a plurality of PNNs. This contrasts with nearly all other approaches to physical neuromorphic architectures where the layout of computational primitives follows form the particular parallel networking approach. FIG. 8 illustrates a multi-BL structure 800 according to an embodiment of the present invention. Each BL reuses the same spectrum and WDM channelization, but may represent different hierarchical levels of organization. A level-1 BL 802 interfaces with other level-1 BLs 802 via lateral PNNs 804 and a level-2 BL 806 via uplink and downlink PNNs 808. Interfacial PNNs may be thought of as regular PNNs whose input spectral weight bank receives the broadcast signals of a different BL. As a result of the processing done in PNN interfaces, network nodes in a given BL may not directly send their outputs to nodes in other BLs, and multi-BL systems may no longer implement all-to-all interconnects. Instead of attempting to faithfully transfer any one signal from one BL to another, the PNN interfaces create mutual informatic relationships that extend beyond BL boundaries. At the same time, PNN interfaces do not experience additional buffering or wavelength allocation constraints, and the BL communication load is constant across different levels of the hierarchy instead of growing exponentially as in some conventional communication networks.

Figure 9:
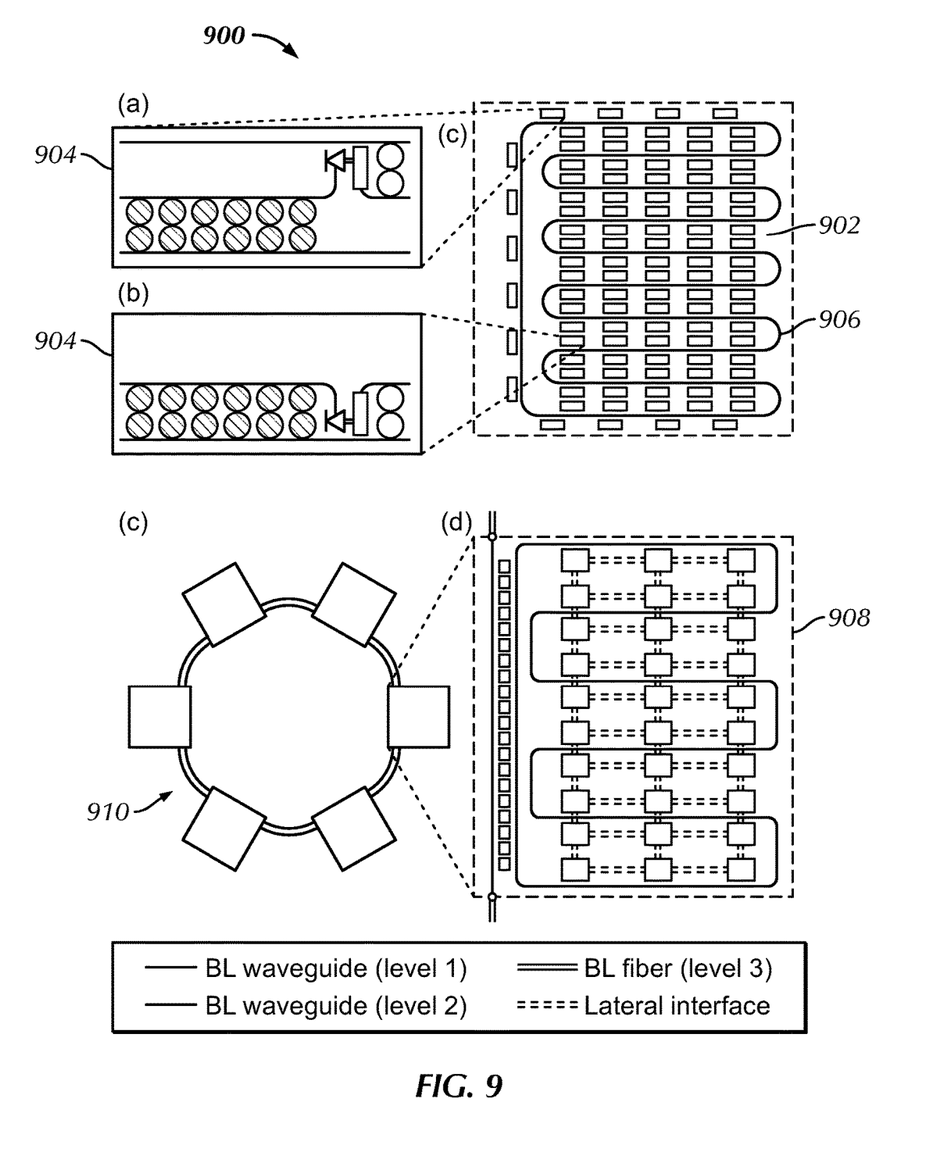
FIG. 9 is a diagram of a sample strategy for a hierarchical network according to an embodiment of the present invention.

FIG. 9 illustrates a sample strategy for a hierarchical network 900 according to an embodiment of the present invention. A first level 902 is a tightly packed group of computational primitives 904 connected by a folded loop 906. Some computational primitives may interface with other loops, either directly with nearby first level loops, or with a second level loop that connects physically distant components on the chip-scale. A second level 908 has similar functionality compared to the first level 902, but occupies a larger area and represents a more complex dynamical processing network. Although the chip scale corresponds to just the second level 908 in this embodiment, intermediate levels on a chip are possible in alternative embodiments. Continuing in this direction of hierarchical levels, a multichip system 910 based on optical loops may be considered.

Spatial layout freedom may be viewed as a powerful tool to combat sparse interconnection constraints inherent in multi-BL spectral reuse and allow a wide potential variety of system organizations. However, determining particular multi-BL organizations and the number of PNNs allocated at each interface represent significant challenges. Nonetheless, theories of distributed computation, such as complex network topology and cortical organization may be invoked to overcome these challenges. Complex network theory describes relationships between interconnection patterns and dynamic functionality in distributed systems. The study of cortical connectomics also provides examples of the types of topological features that may be relevant for processing tasks in neuron-inspired systems.

As a nonlimiting example, a complex network metric referred herein as "small worldness" describes some networks that lie between an ordered and random interconnectivity pattern. "Small worldness" is engendered by both a high clustering coefficient and short average path length. In complex systems, small-world networks have been associated with dynamical complexity and information integration over multiple spatial scales. Spatial layout freedom, discussed above, means a BL may fully interconnect a tightly packed plurality of processing nodes or run over an entire chip area. This coexistence of large fan-in and long-range connections is a physical correlation of simultaneous clustering and short path lengths that typify small-world networks.

In order to realize small-world topological properties in an artificial neural network, an interconnect implementation must support connections over a range of spatial scales. Electrical wires exhibit a bandwidth-distance-energy tradeoff that impedes this goal. Systems based on spatial multiplexing in holograms or cross-bar arrays cannot be easily detached from a characteristic length and have very little flexibility or potential to scale hierarchically. Spatial layout freedom as described above may grant the flexibility required in meeting these goals, making broadcast and weight architectures uniquely suited to explore computationally efficient network topologies.

Three aspects of practical feasibility in photonic processing (cascadability, robustness, and scalability) are now considered with respect to adopting an embodiment of the disclosed network architecture. Cascadability is the ability of a computational element to drive multiple stages of similar devices with fidelity in the presence of noise. Robustness refers to the potential of a system to mitigate the effect of device defects on overall functionality. Scalability is the capacity of an architecture to increase in size and complexity, which requires a system format able to accommodate modular expansion without performance degradation.

Regarding cascadability, in digital electronic topology, a logic gate needs power gain to fan-out multiple other gates, and it must have logic-level restoring behavior to suppress noise. These conditions usually imply cascadability in electronics, yet a more multifaceted notion of cascadability applies to an optical device due to the extra dimension of wavelength (or phase). This extra degree of freedom may be a major boon to functionality in an optical system (such as WDM) but can introduce vulnerabilities to new sources of uncertainty (such as wavelength drift).

An embodiment of the invention disclosed herein may co-integrate complementary physics of optics and analog electronics in order to address cascadability issues in WDM. The PNN curtails propagation of phase/wavelength noise from one stage to another by interleaving optical representations with an analog electronic part of the primary signal pathway. The architecture converts information from multiwavelength inputs onto a single wavelength output, physically capable of driving other PNNs. However, total power detection for wavelength fan-in is inseparable from an analog summation function. While this effect would corrupt channel information in digital signals, the summation corresponds precisely with weighted summation seen in embodiments of the present invention. Fan-out can pose a problem to optical processors because splitting is accompanied by an N-fold reduction in signal power. This loss could be counterbalanced by laser excitable gain, in that small input pulses can trigger the release of a much larger quantity of stored energy, or with additional waveguide amplifier in the BL, or through the use of an off-chip light source.

Regarding robustness, if a given distributed processing task requires a certain number of computational primitives, each device will have some fixed reliability. Since a system requires all devices working, its failure will rapidly approach certainty as the system size (i.e. number of nodes) increases. This unreliability is particularly important for large-scale integrated systems since a defective transistor or laser device cannot simply be replaced after the fact. Robustness may be improved by increasing device yield or by incorporating hardware redundancy called overhead, but these strategies are not always practical and substantially increase overhead costs without ensuring reliability. More sophisticated ways of incorporating redundancy based on coding may be applied in special cases, but no general code theoretic approach to robustness has yet been identified.

However, embodiments of the broadcast and weight network disclosed herein may incorporate small amounts of hardware overhead. Since all PNNs have access to all signals in a single BL, they can be swapped interchangeably in the event of device defect or death. The PNNs are functionally similar, so any unused PNN may virtually swap its interconnection relationships with any defective PNN by exchanging filter bank weights. Overhead PNNs therefore do not backup a single primary PNN, but rather cover all possible failures in the BL. Virtual swapping through reconfiguration may react to specific failures that occur both during fabrication and in the field. Programming a reconfiguration to avoid defects may require high energy and computation costs due to intensive problems of placement and routing associated with mesh networks. However, the broadcast and weight network herein disclosed has no corresponding constraint in mapping automata to devices, trivializing the hardware optimization problem. The network with swappable nodes inverts the conventional trend, exhibiting a failure rate that decreases exponentially with the nominal node count. Unexpectedly, systemic reliability can be better (in some cases by orders of magnitude) than the reliability of a single node.

Regarding scalability, any broadcast and weight can expand to multi-BL architectures due to modular abstractions of the PNN and BL, in which performance limiting electrical links are short and memory of weight values can be locally co-integrated. Modern trends in photonic integration practices that support WDM techniques may grant photonic neural processing architectures a pathway to low cost manufacturing. Fabrication reliability of large-scale integrated systems may be greatly enhanced by the fault mitigation techniques discussed above.

Thus, disclosed herein is a networking architecture utilizing a novel protocol referred to as broadcast and weight, which exhibits properties unique among network architectures. The broadcast and weight architecture draws together principles of fiber optic communication, techniques of computational neuroscience, and technical advances in photonic system manufacturing. A reconfigurable PNN was disclosed which may be implemented with existing standard devices or may generalize to incorporate more advanced technologies. By combining spike processing with WDM, a BL network exhibits a spatial flexibility that enables scalable spectrum reuse with great potential for organizational variety. An architecture of interfaced BLs appears to address many of the challenges encountered in prior proposals for scalable and feasible optical information processing, due in large part to particular correspondences between physical processes in optoelectronics and behavioral functions in the neural-based model.

It is understood that the above-described embodiments are only illustrative of the application of the principles of the present invention. The present invention may be embodied in other specific forms without departing from its spirit or essential characteristics. All changes which come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A network architecture comprising:
   a plurality of processing network nodes, a processing network node of the plurality of processing network nodes comprising:
     at least one tunable analog filter bank;
     a summation module; and
     an analog or digital electronic signal processor;
   at least one broadcasting medium to interconnect the plurality of processing network nodes, the at least one broadcasting medium comprising an integrated waveguide that implements a multi-cast interconnection supporting potential connections between the plurality of processing network nodes; and
   a broadcast and weight protocol that the plurality of processing network nodes abide by, the broadcast and weight protocol comprising:
     continuously tuning one or more received input signals to drop a portion of their corresponding wavelengths;
     summing the one or more received input signals after tuning to be processed into an optical or electrical signal; and
     performing wavelength or mode division multiplexing on each optical or electrical signal to multiplex them into the integrated waveguide.

2. The network architecture of claim 1, wherein the tunable analog filter banks are spectral or mode filter banks to provide partial intensity modulation of incoming signals on a plurality of wavelengths or modes.

3. The network architecture of claim 1, wherein the processing network node of the plurality of processing network nodes further comprises an input and output for receiving and transmitting, respectively.

4. The network architecture of claim 2, wherein the summation module comprises a photodetector.

5. The network architecture of claim 4, wherein the photodetector comprises a pair of photodiodes.

6. The network architecture of claim 5, wherein the tunable spectral filter bank controls both positively weighted and negatively weighted input signals.

7. The network architecture of claim 1, wherein the processor comprises a light transducer.

8. The network architecture of claim 1, wherein the integrated waveguide has a ring topology.

9. The network architecture of claim 1, wherein the at least one broadcasting medium supports all independent interconnections between the plurality of nodes through the use of interfacial processors that connect from one broadcasting medium to another broadcasting medium.

10. The network architecture of claim 1, wherein the integrated waveguide manifests in a shape which supports a layout of the plurality of nodes.

11. The network architecture of claim 1, wherein multiple broadcasting mediums of the at least one broadcasting medium are included on a single chip.

12. The network architecture of claim 11, further comprising interfacial processing network nodes for interconnecting the multiple broadcasting mediums.

13. A method for implementing a network architecture, the network architecture including a plurality of processing network nodes and at least one broadcasting medium to interconnect the plurality of processing network nodes, the method comprising:
configuring a broadcast and weight protocol that the plurality of processing network nodes abide by, the broadcast and weight protocol comprising:
continuously tuning one or more received input signals to drop a portion of their corresponding wavelengths;
summing the one or more received input signals after tuning to be processed into an optical or electrical signal; and
performing wavelength or mode division multiplexing on each optical or electrical signal to multiplex them into an integrated waveguide, the integrated waveguide for implementing a multi-cast interconnection between the plurality of processing network nodes.

14. The method of claim 13, wherein each node comprises at least one tunable spectral filter bank.

15. The method of claim 14, wherein the at least one tunable spectral filter bank controls both positively and negatively weighted inputs.

16. The method of claim 13, wherein each node comprises a photodetector.

17. The method of claim 13, wherein each node comprises a light transducer.

18. The method of claim 13, wherein the integrated waveguide has a ring topology.

19. The method of claim 13, wherein multiple broadcasting mediums of the at least one broadcasting medium represent different hierarchical levels of organization.

20. A non-transitory computer-readable medium having stored thereon a computer program for execution by a processor configured to perform a method for implementing a network architecture including a plurality of processing network nodes and at least one broadcasting medium to interconnect the plurality of processing network nodes, the method comprising:
configuring a broadcast and weight protocol that the plurality of processing network nodes abide by, the broadcast and weight protocol comprising:
continuously tuning one or more received input signals to drop a portion of their corresponding wavelengths;
summing the one or more received input signals after tuning to be processed into an optical or electrical signal; and
performing wavelength or mode division multiplexing on each optical or electrical signal to multiplex them into an integrated waveguide, the integrated waveguide for implementing a multi-cast interconnection between the plurality of processing network nodes.

* * * * *